INVENTORS.
ERNEST FREIREICH
HENRY J. KLOOSTER
By White, Haefliger & Bachand
ATTORNEYS.

United States Patent Office 3,770,622
Patented Nov. 6, 1973

3,770,622
TREATMENT OF WET NATURAL GAS MIXTURES TO RECOVER LIQUID HYDROCARBONS
Ernest Freireich, Los Angeles, and Henry J. Klooster, Buena Park, Calif., assignors to Fluor Corporation, Los Angeles, Calif.
Filed Dec. 28, 1970, Ser. No. 101,495
Int. Cl. C10g 5/04
U.S. Cl. 208—340                               4 Claims

ABSTRACT OF THE DISCLOSURE

Natural gas mixtures containing predominantly methane but also appreciable amounts of heavier hydrocarbons so as to be "wet" are contacted with organic liquids having combined oxygen and in which $CO_2$ and $H_2S$ are relatively more soluble than methane. $CO_2$ and $H_2S$ present are dissolved in the $CO_2$-$H_2S$-organic liquid solution. Dry methane rich gas is obtained, absorbed liquid hydrocarbons are recovered from the organic liquid for their gasoline value, $CO_2$ and $H_2S$ are recovered as gaseous products. $CO_2$ is often vented to atmosphere and the organic liquid is recirculated.

BACKGROUND OF THE INVENTION

This invention has to do with treatment of natural gas mixtures. More particularly, the invention is concerned with a method of treatment for natural gas mixtures by which three major troublesome components of the gas— $CO_2$, $H_2S$ and hydrocarbons heavier than methane—are efficiently and simultaneously separated from the methane, and the heavier hydrocarbons recovered for their gasoline value.

Natural gas is a mixture of hydrocarbons including methane, predominantly; ethane, propane and various amounts of higher molecular weight hydrocarbons together with acid gases such as CO and/or $H_2S$. If the gas is mostly methane with minor concentrations of ethane, propane and butanes, it is called a "dry gas," meaning that it has a very low hydrocarbon dew point. The larger the quantity of heavier hydrocarbons such as pentane and higher homologs, e.g. to $C_{18}$, the higher will be the hydrocarbon dew point. Frequently, the heavier hydrocarbons are present in sufficient quantities to permit passing the gas through a "gasoline extraction plant." In many cases, the hydrocarbon dew point is high enough to require a "dew point control station." This is a unit which removes enough of the heavier hydrocarbons to lower the dew point sufficiently to permit pipeline transmission, but does not compare in efficiency to a gasoline extraction plant which can remove all the heavier materials in addition to a large percentage of the propane and even ethane. In addition, the gas frequently requires conditioning to remove sulfur compounds and carbon dioxide. Usually the gas comes from the wellhead formation saturated with water and the majority of the water must be removed to prevent the formation of ice and hydrates or the acculation of water which can block the flow, as well as cause corrosion.

PRIOR ART

For hydrocarbon dew point control, several conditioning units have been widely used. These are adsorption units using a suitable solid adsorbent such as charcoal, absorption units using a high molecular weight oil, and one or two trays for contacting the gas with the oil. Chilling units have also been used to cool the gas slightly below the dew point desired and separating all condensed hydrocarbons.

If both hydrocarbon dew point control, and removal of carbon dioxide and hydrogen sulfide are required, it has in the past been necessary to use one of the above processes followed by carbon dioxide-hydrogen sulfide absorption using any one of several processes, among which may be mentioned preferential absorption of the $CO_2$ in a selective solvent, e.g. propylene carbonate. See U.S. Pat. 2,926,751.

SUMMARY OF THE INVENTION

It has now been surprisingly discovered that propylene carbonate, and other organic liquids containing combined oxygen and in which $CO_2$ and $H_2S$ are each relatively more soluble than methane, may be used for the recovery of heavier hydrocarbons by absorbing these heavier hydrocarbons into a $CO_2$-organic liquid solution in an absorbing zone, and subsequently separating the organic liquid to recover the heavier hydrocarbons. Simultaneously, $CO_2$, $H_2S$ and water are removed from the natural gas mixture, thus providing a dry sales gas, e.g. a gas having a dew point of $+15°$ F. or lower at 800 p.s.i.g. The heavier hydrocarbons where present in appreciable amounts, i.e. 0.04 weight percent of the mixture are useful as gasoline stocks, making their recovery an economic operation even where their levels are less than those economically processed in a gasoline extraction plant.

Among the many advantages of the present method of treating $CO_2$ and heavier hydrocarbons containing natural gas mixtures there may be mentioned:

(1) No water is put into the gas stream during the processing, because the solvent is water free.

(2) Steel equipment may be used due to very low corrosion rate, because the solvent is water free.

(3) Extensive low temperature refrigeration equipment is not always required.

(4) The cost of the unit per 100 mm. s.c.f.d. feed does not increase as the carbon dioxide concentration increases, and may actually decrease.

(5) The cost of the unit does not increase greatly with increasing heavier hydrocarbon content.

(6) The unit is suitable for installation and operation in low temperature climes.

(7) A steam plant is not usually required.

(8) A cooling tower is not usually required.

(9) Maintenance costs are low.

(10) The unit may easily be designed to run essentially unattended.

(11) Saleable hydrocarbon gasoline values may be obtained by a simple decanting operation.

In particular, the invention provides, in its broader aspects, a method of treating wet, predominantly methane natural gas mixtures also containing acid gases selected from $CO_2$ and/or $H_2S$ in various concentrations, and heavier hydrocarbon components in minor amount above 0.04 weight percent, that includes (1) passing the mixture through an absorption zone providing intimate contact between the mixture and an organic liquid containing chemically combined oxygen and in which the acid gases are relatively more soluble than methane, absorbing liquid hydrocarbon components of the mixture in the acid gas-organic liquid solution, (2) passing a dry methane gas from the zone, (3) passing a liquid stream comprising the organic liquid rich in acid gas, and the liquid hydrocarbon components from the zone, (4) separating the organic liquid from the acid gas, and liquid hydrocarbons, (5) returning the stripped lean organic liquid to the absorption zone, and (6) recovering the liquid hydrocarbons having gasoline value. The method further includes maintaining a superatmospheric pressure and a base temperature between $-20°$ F. and $100°$ F. within the absorption zone, passing the liquid stream to a lower pressure zone and flashing and/or stripping acid gas ($CO_2$, $H_2S$) and hydrocarbons lighter than propane from the liquid stream in this zone, thus to separate $CO_2$, $H_2S$ and light hydrocarbons from the organic liquid. The liquid stream from the absorption zone may be passed to a settling zone where the organic liquid and liquid hydrocarbons are permitted to separate by gravity. The organic liquid, now lean, essentially free of $H_2S$, $CO_2$ and hydrocarbons may be drawn off for return to the absorption zone.

Specific organic liquids which meet the dual criteria of (1) relatively greater $CO_2$ and/or $H_2S$ solubility than methane solubility therein and (2) chemically combined oxygen content are propylene carbonate, N-methyl pyrrolidone, glycerol triacetate and polyethylene glycol dimethyl ether. These organic liquids particularly may be used in the present method in steps including passing through the absorption zone in counterflowing contact with a natural gas mixture containing $CO_2$ and/or $H_2S$ acid gases, and heavier hydrocarbon components in the range of $C_2$ to $C_{18}$ in minor amount as aforementioned, at absorption zone pressures between 200 p.s.i.g. and 2500 p.s.i.g. thereby preferentially dissolving $CO_2$ and $H_2S$ acid gases and absorbing liquid hydrocarbons in the acid gas-organic liquid solution, removing dry methane gas from the zone, separately removing a liquid stream of rich organic liquid and reducing the pressure thereon to flash off $CO_2$ and/or $H_2S$ present and light hydrocarbons, separating liquid hydrocarbon from the organic liquid, recycling the lean organic liquid to the adsorption zone, and recovering the liquid hydrocarbons having gasoline value. The rich organic liquid may contain moisture adsorbed from the gas mixture feed, which moisture is flashed off with $CO_2$. The lean organic liquid following $CO_2$, $H_2S$ and liquid hydrocarbon separation, may be cooled prior to the liquid being recirculated and contacted with fresh gas mixture in the adsorption zone.

A highly preferred embodiment of the present method includes passing the aforementioned natural gas mixture having a relatively high dew point through an absorption zone at a pressure between 600 and 2000 p.s.i.g. in a counterflowing contact with propylene carbonate, and thereby preferentially dissolving acid gases selected from $CO_2$ and $H_2S$ in propylene carbonate and absorbing liquid hydrocarbons in the acid gas-propylene carbonate solution, passing a methane gas stream having a relatively low dew point from the zone, separately passing a liquid stream of propylene carbonate rich in acid gases and liquid hydrocarbon to a separation zone at a reduced pressure to flush or strip off $CO_2$, $H_2S$ and light hydrocarbons and gravity separate the gasoline quality hydrocarbons from the acid gas-propylene carbonate solution, recovering the liquid hydrocarbons having gasoline value, recovering $CO_2$ and $H_2S$ as a gaseous product or venting $CO_2$ and $H_2S$ to the atmosphere and recirculating the resultant lean propylene carbonate to the absorption zone.

DESCRIPTION OF THE PREFERRED EMBODIMENTS

Figure 1:
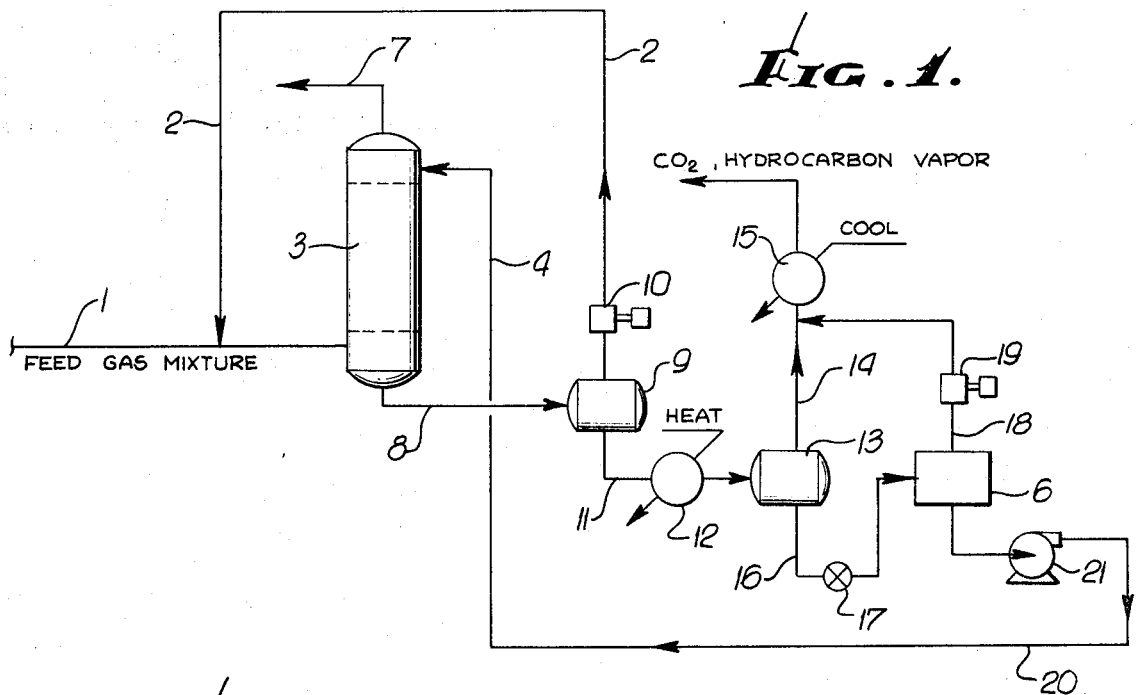
FIG. 1 is simplified flow sheet diagram of the present invention method.

As mentioned, the present method is suited to the treatment of natural gas mixtures which are predominantly methane, but which also contain acid gases such as $CO_2$, $H_2S$ and other sulfur compounds and particularly heavier hydrocarbons such as ethane, propane, isobutane, butane, pentane, isopentane, hexanes, heptanes, octanes, nonanes, decanes, undecanes and dodecanes as well as higher molecular weight hydrocarbons, up to e.g. $C_{18}$ compounds. The heavier hydrocarbon content is to be above about 0.04 weight percent and typically will be between 0.25 and 0.80 weight percent, based on the total weight of the natural gas mixture. A convenient maximum heavier hydrocarbon content will be about 1.5 weight percent or somewhat higher.

The $CO_2$ and/or $H_2S$ solvent and liquid hydrocarbon absorbent useful herein may be selected from propylene carbonate, N-methyl pyrrolidone, glycerol triacetate and polyethylene glycol dimethyl ether and other like organic liquids which are characterized as follows: $CO_2$ and $H_2S$ are relatively more soluble therein than methane, and preferably by a factor of 5 or higher sulfur operating conditions and each contains chemically combined oxygen, e.g. in hydroxyl, carboxyl, ether or salt form. The mentioned compounds are known to be preferential solubilizers of $CO_2$ and $H_2S$ in methane gas streams but their utility for absorbing liquid hydrocarbons during $CO_2$ and $H_2S$ removal from such gas streams so as to enable recovery of gasoline values from wet natural gas streams has not been known heretofore.

The pressure in the absorption zone is typically superatmospheric, i.e. at least 600 p.s.i.g. A pressure in this zone in the range of 200 to 2500 or higher or lower may be used, with pressure of 600 to 2000 being highly effective when propylene carbonate is the solvent-absorber.

The pressure downstream of the absorption zone are typically lower, e.g. from just below the absorption zone pressure down to subatmospheric pressure.

The temperatures downstream of the absorption zone are not narrowly critical and will be adjusted for convenience in separation of product and recycle liquid. Typically, the recirculated organic liquid, propylene carbonate or other, is cooled following liquid hydrocarbon separation and prior to again contacting the natural gas feed mixture in the absorption zone.

Relative quantities of organic liquid and feed gas mixture are not narrowly critical with molal ratios of 1:1 to 10:1 or more or less being suitable. The organic liquid generally is charged to the system and continuously enriched and stripped on recirculation.

Referring now to the drawing in FIG. 1, a feed gas mixture having a composition as given in the table below enters the system through line 1, and with recycled gas from line 2 is passed into the bottom of absorber 3. Organic liquid, hereinafter for illustration specifically propylene carbonate, is fed to the absorber 3 along line 4 from a separation vessel or stripped 6, to the top of the absorber to flow countercurrently to the gas mixture entering from line 2. The methane rich gas passes upwardly through the absorber 3 to exit along line 7 as sales gas, suitably dry for pipeline transmission. $CO_2$, $H_2S$, other sulfur compounds and liquid hydrocarbons are dissolved or entrained in the propylene carbonate, along with some methane perhaps, and exit the absorber as bottoms along line 8. The $CO_2$-propylene carbonate solution with $H_2S$ and liquid hydrocarbons absorbed therein is passed along line 8 to flash separator 9 whence vapors are passed back along line 2 through compressor 10 to the feed mixture and liquid along line 11, through heater 12 to lower pressure flash drum 13 where $CO_2$, $H_2S$ and lower molecular weight hydrocarbons are flashed off for passage through line 14 and cooler 15 to hydrocarbon recovery and $CO_2$ and $H_2S$ venting or recovery stages (see FIG. 2), while propylene carbonate and additional hydrocarbons are passed along line 16 through liquid level valve 17 to a separator drum or a stripped tower 6 operating at atmospheric or subatmospheric pressures. The overhead gases from the separator drum or stripper tower 6, comprising primarily the heavier hydrocarbons essentially free of propylene carbonate, is compressed by compressor 19 and passed in line 18 to cooler 15 in line 14 for recovery of gasoline values and recovery or venting of $CO_2$ and $H_2S$ therein. The proylene carbonate in stripper 6, essentially free of hydrocarbons, $H_2S$ and $CO_2$ is recycled to the absorber 3 through line 4, line 20 and pump 21.

Figure 2:
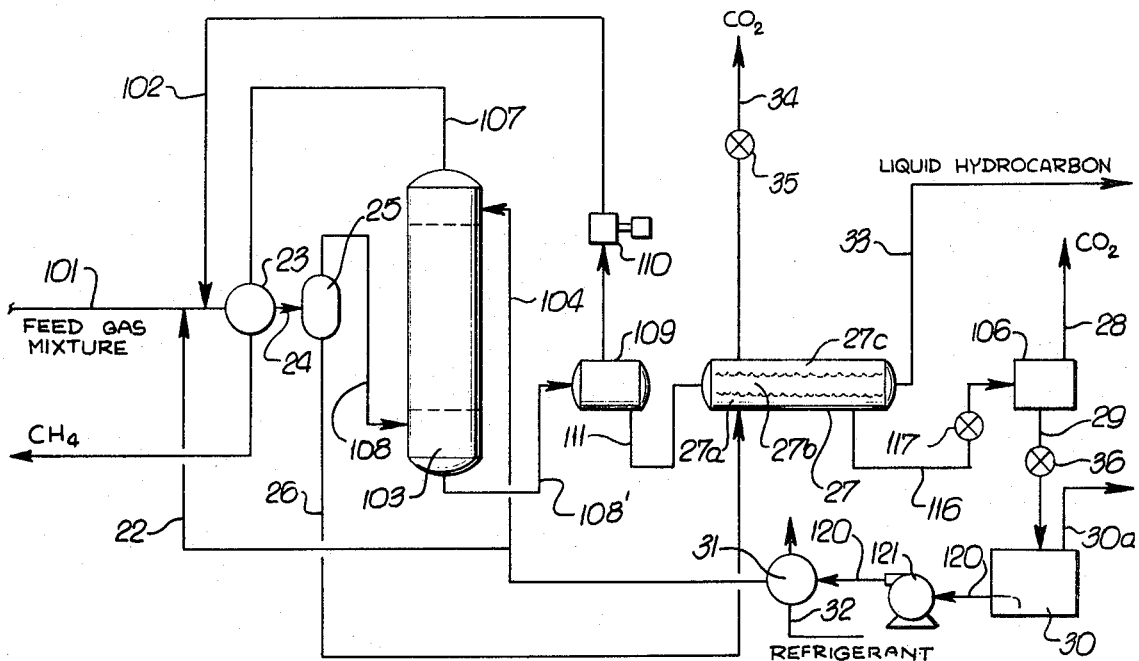
FIG. 2 is a flow sheet diagram of an embodiment of the present method particularly adapted to the use of propylene carbonate.

In FIG. 2, where like components to FIG. 1 are given the same number plus 100, the natural gas mixture feed in line 101 is combined with a trickle of propylene carbonate or other organic liquid $CO_2$ solvent-absorbent from line 22. The amount of organic liquid added in this manner may range between 0.5 and up to 5 weight percent of the propylene carbonate or other organic liquid used in the process proportionately to the water content of the feed mixture. Recycle vapors from line 102 are mixed with the feed prior to entry into the bottom of absorber

EXAMPLE

A dry methane gas was obtained from a wet natural gas mixture having the composition shown in the table using the flow scheme of FIG. 2 under temperature and pressure conditions also shown in the table. Column headings in the table material balance correspond to numerals in the drawing.

TABLE

| | Feed gas, 101 | Recycle gas, 102 | Lean oil, 104 | Sales gas, 107 | Rich oil, 108 | Flash, 34 | Liquid hydrocarbon, 33 | Flash 82 | Flash 30a |
|---|---|---|---|---|---|---|---|---|---|
| $N_2$ | 51.9 | 1.015 | | 51.47 | 1.445 | .408 | | .022 | |
| $CO_2$ | 2,269.1 | 75.92 | 308.6 | 222.205 | 2,431.4 | 459.7 | | 1,422.7 | 162.67 |
| $CH_4$ | 6,318.4 | 197.0 | | 6,119.99 | 395.42 | 179.05 | | 19.242 | .113 |
| $C_2H_6$ | 108.2 | 6.53 | .000 | 78.99 | 35.76 | 19.18 | | 9.96 | .289 |
| $C_3H_8$ | 24.6 | 1.215 | 1.007 | 2.269 | 24.553 | 7.219 | | 13.939 | 1.162 |
| $iC_4H_{10}$ | 3.5 | .098 | .494 | .199 | 3.893 | .67 | .04 | 2.32 | .27 |
| $nC_4H_{10}$ | 7.9 | .1415 | 2.475 | .559 | 9.957 | 1.07 | .14 | 5.38 | .74 |
| $iC_5H_{12}$ | 2.6 | .023 | .745 | .228 | 3.150 | .17 | .68 | 1.32 | .20 |
| $nC_5H_{12}$ | 2.6 | .020 | .830 | .216 | 3.243 | .16 | .76 | 1.25 | .20 |
| $nC_6H_{14}$ | .9 | .0039 | 1.10 | .0955 | 1.912 | .029 | .30 | .316 | .052 |
| $nC_7H_{16}$ | .87 | .0032 | 3.33 | .130 | 4.078 | .0264 | .33 | .326 | .054 |
| $nC_8H_{18}$ | 1.53 | .0039 | 10.5 | .168 | 11.873 | .032 | .87 | .396 | .066 |
| $nC_9H_{20}$ | .6 | .00181 | 10.5 | .0769 | 11.028 | .014 | .31 | .170 | .028 |
| $nC_{10}H_{22}$ | .4 | .00105 | 14.0 | .0549 | 14.348 | .0095 | .20 | .116 | .019 |
| $nC_{11}H_{24}$ | .13 | .00041 | 8.75 | .018 | 8.863 | .0033 | .06 | .0392 | .0063 |
| $nC_{12}H_{26}$ | .07 | .00018 | 7.0 | .0091 | 7.061 | .0013 | .04 | .016 | .0026 |
| PC, $C_4H_6O_3$ | | | 11,000.0 | | 11,000.0 | | | | |
| T. °F | 25 | 18 | 5 | 8 | 36 | 11 | 11 | −8 | −11 |
| P.s.i.a. | 815 | 435 | 815 | 813 | 815 | 115 | 115 | 16 | 10 |

103. Absorber 103 operation is as described above with propylene carbonate or the like from line 104 flowed downwardly and countercurrently to the feed gas so that methane essentially free of most heavier hydrocarbons, $CO_2$, $H_2S$ and other extraneous acid gases passes out of the absorber along line 107 as sales gas. Absorber pressure is suitable 600 to 2000 p.s.i.g. for propylene carbonate usage. In this embodiment, the sale gas in line 107 is heat exchanged in exchanger 23 with the incoming feed gas mixture in line 101.

The feed is passed from heat exchange 23 through line 24 to a preliminary gas/liquid separtor 25 where a liquid water rich solvent-absorbent hydrocarbon mixture is withdrawn along line 26 and passed to a settling zone comprising separator 27 for purposes to be explained, while the balance of the feed mixture is fed into the bottom of absorber 103 along line 108.

The solvation of $CO_2$ and like acid gases and the absorption of liquid hydrocarbons in absorber 103 provides a liquid bottoms stream along line 108' from the absorber 103 to an initial flash drum 109 suitably at 200 to 800 p.s.i.g. where the vapors are separated and passed along line 102 back to the feed line 101 through compressor 110, while the drum liquids are passed along line 111 into settling separator 27. The separator 27 is designed to permit gravity separation of propylene carbonate as the lower phase 27a, liquid hydrocarbon as the intermediate phase 27b and hydrocarbon vapor, $H_2S$ and/or $CO_2$ as the upper phase 27c in the tank. The propylene carbonate is withdrawn along line 116 through liquid level control valve 117 to a stripper tower or flash drum 106 operating at essentially atmospheric pressure where $CO_2$ and other gases are removed through line 28. The propylene carbonate is passed along line 29 through level control valve 36 to a stripper tower or flash drum 30 where $CO_2$ and the remaining gases are removed through line 30a. The solvent now essentially free of hydrocarbon, $CO_2$ and other acid gases, is recycled along line 120, through pump 121, through heat exchanger 31 (supplied with refrigerant through line 32) to line 104 and then to the absorber 103 for reuse.

The supernatant liquid hydrocarbon in settling tank 27 is decanted or drawn off along line 33 to recovery of gasoline values.

The vapor in settling tank 27 is passed out of the system along line 34 through control valve 35.

We claim:
1. The method of treating wet, predominantly methane natural gas mixtures containing acid gases selected from $CO_2$ and $H_2S$ and heavier hydrocarbons in the range of $C_2$ to $C_{18}$ in an amount between 0.04 and 1.5 weight percent, that includes adding from 0.5 to 5 percent by weight of the amount to be used of propylene carbonate to the gas mixture, passing the resulting mixture through an absorption zone at a pressure between 600 and 2000 p.s.i.g. in counterflowing contact with the balance of the propylene carbonate and absorbing liquid hydrocarbons in the acid gas-propylene carbonate solution, passing a methane gas stream having a relatively low dew point from the zone, separately passing a liquid stream of propylene carbonate rich in acid gases and liquid hydrocarbon to a settling zone at a reduced pressure to flash off the $CO_2$ and gaseous components and gravity separate the liquid hydrocarbons from propylene carbonate, recovering the liquid hydrocarbons having gasoline value by decantation, venting the $CO_2$ and/or $H_2S$ and gaseous components and recirculating the lean propylene carbonate to said absorption zone.

2. Method according to claim 1 in which the base temperature in said absorption zone is between −20° F. and 100° F.

3. Method according to claim 2 in which said separation zone pressure is between 350 and 550 p.s.i.g.

4. Method according to claim 3 in which said separation zone temperature is between −20° F. and 100° F.

References Cited

UNITED STATES PATENTS

| | | | |
|---|---|---|---|
| 2,339,680 | 1/1944 | Carney | 208—341 |
| 3,324,627 | 6/1967 | Kohrt | 55—73 |
| 2,649,166 | 8/1953 | Porter et al. | 55—68 |
| 2,926,751 | 3/1960 | Kohl et al. | 55—68 |
| 2,926,752 | 3/1960 | Redemann et al. | 55—68 |
| 2,826,266 | 3/1958 | Hachmuth et al. | 55—68 |
| 3,099,619 | 7/1963 | Harper | 208—341 |

HERBERT LEVINE, Primary Examiner

U.S. Cl. X.R.

55—68, 73; 208—341

UNITED STATES PATENT OFFICE
CERTIFICATE OF CORRECTION

Patent No. 3,770,622    Dated November 6, 1973

Inventor(s) Ernest Freireich and Henry J. Klooster

It is certified that error appears in the above-identified patent and that said Letters Patent are hereby corrected as shown below:

Column 1, line 38; "gether with acid gases such as CO and/or $H_2S$. If the gas" should read --gether with acid gases such as $CO_2$ and/or $H_2S$. If the gas--.

Column 1, line 59; "culation of water which can block the flow, as well as" should read --cumulation of water which can block the flow, as well as--.

Column 3, line 46; "pressure to flush or strip off $CO_2$, $H_2S$ and light hydro-" should read --pressure to flash or strip off $CO_2$, $H_2S$ and light hydro- --.

Column 4, line 9; "preferably by a factor of 5 or higher sulfur operating" should read --preferably by a factor of 5 or higher under operating--.

Column 4, line 23; "The pressure downstream of the absorption zone are" should read --The pressures downstream of the absorption zone are--.

Column 4, line 44; "4 from a separation vessel or stripped 6, to the top of the" should read --4 from a separation vessel or stripper 6, to the top of the--.

Column 4, line 62; "valve 17 to a separator drum or a stripped tower 6" should read --valve 17 to a separator drum or a stripper tower 6--.

Column 4, line 70; "of $CO_2$ and $H_2S$ therein. The proylene carbonate in" should read --of $CO_2$ and $H_2S$ therein. The propylene carbonate in--.

UNITED STATES PATENT OFFICE   Page 2
CERTIFICATE OF CORRECTION

Patent No. 3,770,622        Dated   November 6, 1973

Inventor(s)  Ernest Freireich and Henry J. Klooster

It is certified that error appears in the above-identified patent and that said Letters Patent are hereby corrected as shown below:

Column 5, line 36; "sure is suitable 600 to 2000 p.s.i.g. for propylene car-" should read --sure is suitably 600 to 2000 p.s.i.g. for propylene car- --.

Column 6, TABLE;

| | Flash | | should read | Flash | |
|---|---|---|---|---|---|
| | 82 | 30a | | 28 | 30a |
| | .022 | ----- | | .022 | ----- |
| | 1,422.7 | 162.67 | | 1,422.7 | 162.67 |
| | 19,242 | .113 | | 19,242 | .113 |
| | 9.96 | .289 | | 9.69 | .289 |

Signed and sealed this 23rd day of April 1974.

(SEAL)
Attest:

EDWARD M. FLETCHER, JR.
Attesting Officer

C. MARSHALL DANN
Commissioner of Patents